United States Patent [19]

Cheung

[11] Patent Number: 5,361,262
[45] Date of Patent: Nov. 1, 1994

[54] ESTIMATED-QUEUE, EXPANDED-BUS COMMUNICATION NETWORK

[75] Inventor: Kwok-wai Cheung, Austin, Tex.

[73] Assignee: Bell Communications Research, Inc., Livingston, N.J.

[21] Appl. No.: 49,465

[22] Filed: Apr. 16, 1993

[51] Int. Cl.$^5$ ............................ H04J 3/02; H04J 3/16
[52] U.S. Cl. .................................. 370/85.7; 370/85.9; 370/85.11
[58] Field of Search ............ 370/94.1, 94.2, 95.1–95.2, 370/85.1–85.2, 85.6–85.7, 85.9, 85.11, 110.1; 340/823.5, 825.52

[56] References Cited

U.S. PATENT DOCUMENTS

| | | | |
|---|---|---|---|
| 5,001,707 | 3/1991 | Kositpaiboon et al. | 370/94.1 |
| 5,072,443 | 12/1991 | Hahne et al. | 370/85.9 |
| 5,081,622 | 1/1992 | Nassehi et al. | 370/85.2 |
| 5,111,456 | 5/1992 | Limb | 370/85.1 |
| 5,128,937 | 7/1992 | Khalil | 370/85.6 |
| 5,157,657 | 10/1992 | Potter et al. | 370/85.1 |
| 5,173,898 | 12/1992 | Heinzmann et al. | 370/94.1 |

OTHER PUBLICATIONS

R. M. Newman et al., "The QPSX Man," IEEE Communications Magazine, 1988, vol. 26, pp. 20–28.
"Distributed Queue Dual Bus (DQDB) Subnetwork of a Metropolitan Area Network (MAN)," IEEE Standard 802.6, Dec. 1990. —Abstract—.
K. Cheung, "Design and Implementation Considerations for Wavelength-Division Multiplexed (WDM) Photonic Dual Bus," ICC '92, Paper 330.6, Chicago, Jun. 1992.
K. W. Cheung et al., "Estimated-Queue Expanded Bus (EQEB) Protocol for Single-Hop Multichannel Lightwave Network," 1992, Electronics Letters, vol. 28, pp. 855–857.
K. W. Cheung., "EQEB-A Multi-Channel Extension of the DQDB Protocol with Tunable Channel Access," Globecom '92, Orlando, Fla., Dec. 1992.
K. W. Cheung, "A Subcarrier-Multiplexed Photonic Dual Bus with Tunable Channel Slotted Access for Local/Metropolitan Area Networks," OFC '92, Feb. 1992.
M. A. Rodrigues, "Erasure Node: Performance Improvement for the IEEE 802.6 MAN," IEEE Infocom '90, pp. 636–642, 1990.

*Primary Examiner*—Wellington Chin
*Assistant Examiner*—Chau T. Nguyen
*Attorney, Agent, or Firm*—Leonard Charles Suchyta; James W. Falk

[57] ABSTRACT

A distributed-queue, expanded-bus communication network and the protocol for its operation. A dual bus (42) has two counter-propagating buses (44,46) each having multiple channels (48), preferably wavelength-division multiplexed. A plurality of nodes 52 arranged along the bus receive data segments only from one each of the counter-propagating channels but can tune to any of the channel pairs for transmission. Head ends (50) at each end of the buses generate (100) formatted slots (90) upon the individual channels. Included in the format is a request field REQ and a multi-bit global request count field GRC. The head end calculates the global request count for one outgoing channel from a series of request fields received on the corresponding incoming channel. When a node has a data segment to transmit, it determines on which channel it is to be transmitted and tunes (56) to both that forward channel and the corresponding reverse channel on the other bus. It reads the current value of the global request count from the forward channel and uses it to calculate (126) a request delay and an access delay. The delays also depend on fairness values (128) indicating the node's position along the bus so as to not favor one node over another. After the request delay, the node inserts its request into the request field of a slot in the reverse channel, and the data segment thereby joins the distributed queue. Thereafter, after the access delay, the node inserts the data segment into an empty slot propagating in the forward direction.

11 Claims, 8 Drawing Sheets

$$L'(t) = \frac{\sum_{i=1}^{J} REQ(t-i)}{J}$$

$$GRC(t) = F\{L'(t)\}$$

ESTIMATED-QUEUE, EXPANDED-BUS COMMUNICATION NETWORK

FIELD OF THE INVENTION

The invention relates generally to communication networks. In particular, the invention relates to a communication-network architecture and its equipment in which control of access to a multi-channel network is distributed around the network.

BACKGROUND ART

The telephone system and other multi-user data networks are facing a significant change from their usual hierarchical, tree-like architectures. An architecture gaining favor for metropolitan-area networks (MANs) and even local-area networks (LANs) is based on the distributed-queue, dual-bus (DQDB) protocol, described by Newman in "The QPSX Man," *IEEE Communications Magazine*, vol. 26, 1988, pp. 20–28. A DQDB network is specified in *IEEE Standard* 802.6, "Distributed Queue Dual Bus (DQDB) Subnetwork of a Metropolitan Area Network (MAN)," December, 1990.

As illustrated in FIG. 1, a DQDB network 8 includes a dual bus 10 of two anti-parallel, unidirectional communication lines 12 and 14 conveying data signals in opposite directions. A primary frame generator 16 at the head end of one communication line 12 generates frame synchronization upon that communication line 12 according to the frame format illustrated in FIG. 2. A slave frame generator 18 at the head end of the other communication line 14 is slaved to the primary frame generator 16 and generates similar frame synchronization on the other communication line 14. A number N of nodes 20 are arranged along the dual bus 10. Each node 20 receives data from read taps 22 from both communications lines 12 and 14 and can write data along the propagation direction of the communication line 12 or 14 through unidirectional write taps 24. The read taps 22 are arranged upstream from the corresponding write taps 24 to allow a node 20 to read all data on the communication lines 12 and 14 irrespective of what it is writing on them.

Each frame 30, as shown in FIG. 2, has an interval of 125 μs to match similar frames in digital telephony. The frame 30 starts with a frame header 32 followed by a fixed number of slots each having 424 bits (53 bytes or octets) and ends with a footer 36, which for DS-3 contains two octets. Each slot 34 can be used for either isochronous or non-isochronous communication. In isochronous communication, overall system control, not illustrated here, assigns a particular slot 34 of each frame to one node 20 so that it can transmit data at a fixed rate. Isochronous channels are relatively easy to control, are compatible with the non-isochronous nature of the present invention, and will not be further discussed.

In non-isochronous communication, a node 20 assigns to itself an available empty slot 34 and fills it with a segment of a data packet. Each node 20 handles its own non-isochronous access to the slots 34 according to a distributed queuing protocol executed at each node 20. In a simple implementation, the DQDB protocol requires only two bits BUSY and REQ at the head of each slot 34 followed by data, specifically a segment 37 of a data packet. The slot 34 contains additional control bits not relevant to the invention, such as a bit indicating whether this slot 34 is reserved for isochronous access by a particular node.

The single-bit BUSY control field indicates whether the slot 34 is full and hence not available. The single-bit REQ control field passes information through the network about the number of upstream non-isochronous requests for a slot 34. Every active REQ field passing a node 20 indicates that an upstream node 20 has queued a packet segment for transmission. When a node 20 has a segment waiting for transmission on, for instance, the rightward communication line 12, it issues a single active REQ control bit on an otherwise empty REQ control-bit location in the first REQ-empty slot 34 propagating on the leftward communication line 14. That is, it transmits the active REQ bit in the reverse direction from the direction along which it wants to transmit the segment. Only one segment awaiting transmission is placed in the portion of the distributed queue within a single node 20.

Each node 20 keeps track of the number of segments queued downstream from itself along one communication line 12 or 14 in which it desires to transmit a data segment by detecting the successive active REQ bits as they pass in the reverse direction on the other communication line 14 or 12 and by incrementing a request counter RQ. The node 20 further decrements an RQ counter whenever an empty slot 34, i.e. non-BUSY, passes it in the forward direction because it can assume that one downstream-queued request is satisfied by the empty slot.

When a node 20 attempts to queue a segment into its single-segment local portion of the distributed queue, it does two things. It transmits one active REQ bit in the reverse direction, and it transfers the count in the request counter RQ to a second, countdown counter CD not shown. The node 20 decrements the countdown counter CD for each passing empty slot 34, which will be used by a downstream node 20 that is more senior to it in the distributed queue. When the countdown counter CD in a node 20 reaches zero, that node 20 can transmit its segment in the first empty slot.

The dual-bus network of FIG. 1 operating with the DQDB protocol exhibits low delay latency in lightly loaded conditions. In heavily loaded conditions, it exhibits fair access and high throughput and operates free of congestion. It is also highly reliable. The taps 22 and 24 do not need to channel all the data through the nodes 20 but merely read and selectively write to the communication lines 12 and 14. In practical electronic systems, however, the taps 22 and 24 regenerate passing signals and perform a minimal amount of switching. Nonetheless, if a node 20 fails, in most failure modes it simply drops out without affecting the rest of the network.

The network can be made into a near ring by physically wrapping the communication lines 12 and 14 into a ring geometry although the two frame generators 16 and 18 are effectively located at neighboring nodes. If selectively activatable frame generators are located at each node 20, when the dual bus 10 is accidentally severed at a location between two nodes 20, the ring can quickly reconfigure itself with the failed bus section excluded from the ring but with all nodes still connected to the reconfigured near ring.

The DQDB architecture can be effectively used with electrical transmission lines or with optical fibers. Indeed, it is important that the architecture used with electrical transmission lines be equally usable with optical fibers because the network is being progressively converted to the higher-capacity fibers. However, the DQDB architecture in fact cannot fully utilize the full advantages of optical fiber.

Silica optical fiber has a nearly unlimited optical bandwidth measured in many terabits per second ($10^{12}$ bits/sec). In contrast, the speed of electronics is far below this level. Advanced fiber communication systems are being installed with electronics operating at 2.5 gigabits per second ($2.5 \times 10^9$ bits/sec). Advanced prototypes are being designed for operation at 10 gigabits per second. Such speeds are approaching fundamental limitations of the operation of silicon electronics. Much higher speeds seem infeasible over even the medium term. The DQDB architecture, however, is dependent upon a sizable portion of the node electronics operating at the speed of the communication lines.

Several suggestions have been made for dividing the bandwidth of silica fibers into several smaller channels of bandwidth commensurate with silicon electronics. Effectively, the communication lines 12 and 14 can then be considered as communication buses of multiple parallel lines or channels. As an example, wavelength-division multiplexing (WDM) uses multiple lasers operating at different optical carrier frequencies to simultaneously impress several different data signals on one optical fiber. At the receiving end, the optical signal is frequency filtered or divided, and the individual optical carriers are detected. Other examples that divide bandwidth include space-division multiplexing, sub-carrier multiplexing, and time-division multiplexing. However, DQDB suffers drawbacks with such an expanded bus of parallel channels since it must unambiguously track all upstream and downstream traffic to maintain its counters current.

In general, the distributed-queue, dual-bus architecture scales poorly with both increasing number of nodes and increasing bit rates. When a large number of nodes are connected to the dual bus, the average bandwidth per node becomes very small as a result of the multi-access nature of DQDB. An access bandwidth utilization factor (ABUF) is defined as the average available bandwidth per node at peak load divided by the peak access bandwidth. For a DQDB network with N nodes, $ABUF \simeq 1/N$. Hence, DQDB is not very effective for large N.

SUMMARY OF THE INVENTION

The invention can be summarized as a communications network utilizing an estimated-queue, expanded-bus protocol. The expanded bus includes multiple communication channels propagating in two anti-parallel directions. Nodes are arranged along the expanded bus and can tune themselves to one of the channels in each direction. When a node has a segment waiting for transmission in a slot propagating in the forward direction on a particular channel, it (1) tunes to the desired forward channel and the corresponding reverse channel, (2) receives a global request count from the desired channel pair, and (3) places a request for transmission into a request control field in a slot propagating in the reverse direction. A head end station receives the requests for a channel over a number of slot periods and issues a corresponding value of the multi-bit global request count in a global request control field of a slot being transmitted along the desired forwardly propagating channel. The node delays the segment transmission and possibly the request transmission by a period determined by the global request counter. Thereafter, it transmits its data on a non-busy slot.

DETAILED DESCRIPTION OF THE PREFERRED EMBODIMENTS

Figure 1:
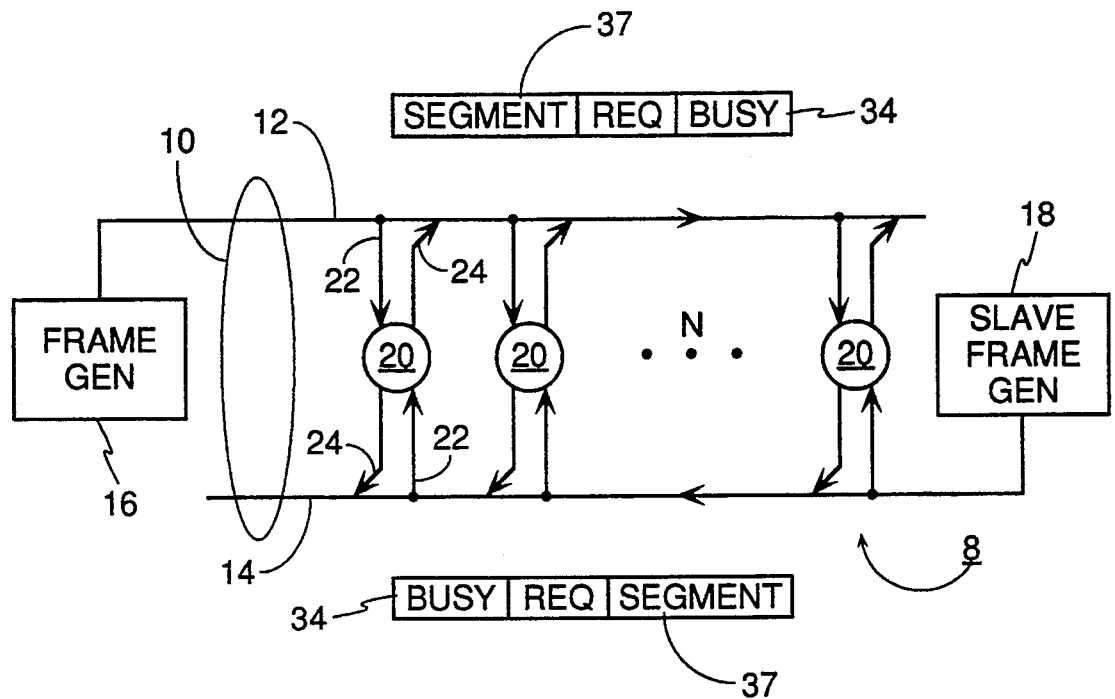
FIG. 1 is circuit diagram of a linear dual-bus communication network usable with the distributed-queue, dual bus (DQDB) protocol.
Figure 2:
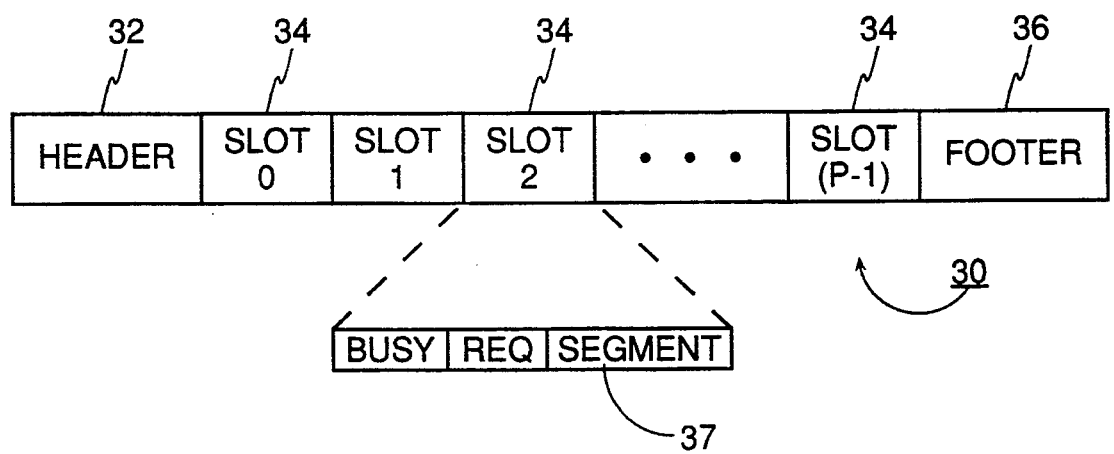
FIG. 2 is a frame format used in the DQDB protocol.
Figure 3:
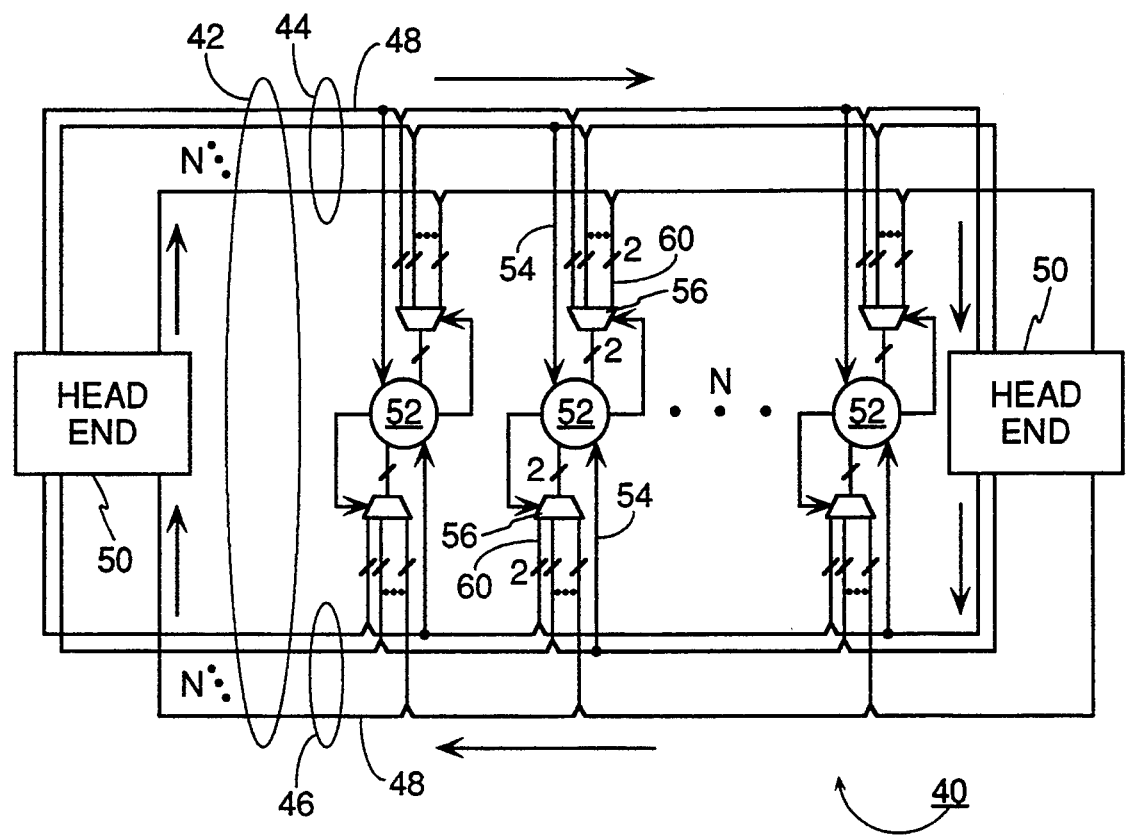
FIG. 3 is a circuit diagram of a linear embodiment of an expanded-bus communication network usable with estimated-queue, expanded-bus (EQEB) protocol of the invention.

An embodiment of an expanded-bus network 40 is schematically illustrated in the circuit diagram of FIG. 3. An expanded bus 42 has a rightwardly propagating bus 44 and a leftwardly propagating bus 46. Each bus 44 or 46 has M channels 48. Although the buses 44 and 46 are illustrated for convenience as being space-division multiplexed into the multiple channels 48, other types of multiplexing are implicitly included in the description, and wavelength-division multiplexing (WDM) is preferred. I have described such an expanded dual bus in "Design and Implementation Considerations For Wavelength-Division Multiplexed (WDM) Photonic Dual Bus," ICC '92, Paper 330.6, Chicago, June 1992.

Two head ends 50, which are slaved together, are connected to opposite ends of the expanded bus 42. Each receives request data from an upstream bus 44 or 46, and each generates framing synchronization and also transmits control information on a downstream bus 46 or 44 according to a slot format to be described later with reference to FIG. 4. Framing synchronization has been adopted in IEEE 802.6 for the DQDB standard, but it may not be necessary when burst-mode receivers are used.

A number N of nodes 52 are arranged along the expanded bus 42.

For data reception, each node 52 is connected permanently or at least on a semi-permanent basis through a reception tap 54 to only one of the channels 48 in each of the buses 44 and 46. That is, data destined for a particular node 52 from a given leftward or rightward direction must be transmitted on a particular channel 48 because that is the only channel 48 from which the destination node 52 receives data. Multiples nodes 52 may receive data from the same channel 48, and the multiple reception taps 54 are preferably arranged in a cyclical fashion but taking into account expected loads so as to balance total loading on each channel 48.

For data transmission, each node 52 can tune or switch itself through a switch 56 to any one of the channels 48 on either bus 44 or 46, and normally simultaneously tunes to two paired channels 48 on the two buses 44 and 46. Nonetheless, each channel 48 in the rightward bus 44 will be assumed to be logically paired with channel 48 in the leftward bus 46, thereby constituting paired communication lines.

The switch 56 is connected to the node 52 through a twin node tap 58 and is connected to the M channels 48 on its bus 44 or 46 through M twin channel taps 60. The node 52 controls the switch 56 such that the node 52 can select a channel 48 from which it receives control information and to which it can simultaneously transmit data segments and control information. On the other hand, the node 52 receives data segments through the reception tap 54, and, as previously mentioned, any node 52 receives data segments from only corresponding pairs of channels 48 on the buses 44 and 46.

The EQEB architecture of FIG. 3 enjoys the important advantage that the nodes 52, the switch 56, and the associated connections 58 and 60 are all operating at the bit rate of one of the channels 48, but yet the bus bit rate is M times the bit rate of these node elements 52, 56, 58, and 60. As a result, ABUF is increased to M/N.

For a node 52 to receive data segments from its allocated channel 48 requires little more than that its reception tap 54 tap off only a portion of the signal from the allocated channel 48. Alternatively, it regenerates the slots not intended for reception by its associated node 52. The so received data segments are reassembled into packets and forwarded to applications associated with that node 52 in a manner well known in modern communications. Accordingly, the reception portion of the node 52 will not be discussed further in great detail, and its structure will become obvious after considering the more complex transmission portion.

Figure 5:
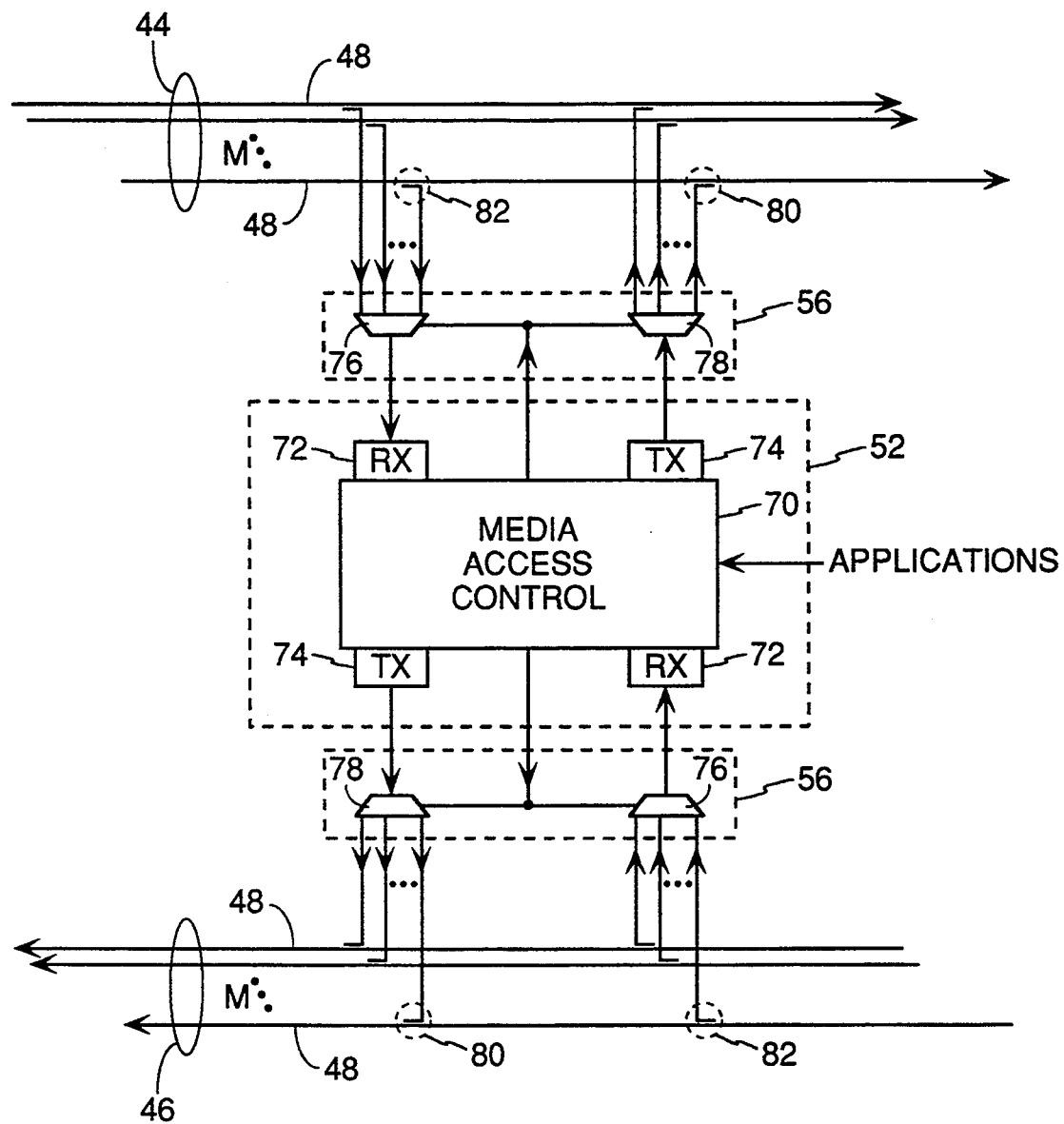
FIG. 5 is a more detailed circuit diagram of a node of FIG. 3.

The transmission portion of the node 52 is illustrated in more detail in FIG. 5 for an embodiment directed to wavelength-division multiplexing even though space-division multiplexing is explicitly illustrated. The transmission part of the node 52 includes a media-access control module 70 having separate receivers 72 and transmitters 74 for the two buses 44 and 46. The media-access control module 70 accepts packets for transmission from applications associated with the node 52. The corresponding reception modules receive packets from the buses 44 and 46 forward them to those applications. Each switch 56 includes an M-to-1 switch 76 and a 1-to-M switch 78. The M-to-1 switch 76 can receive signals from all M channels 48 on one bus 44 or 46 and can switch one of the channels to the receiver 72 while the 1-to-M switch 78 receives a signal from the transmitter and switches it to one of the M channels 48 through unidirectional transmit couplers 80 directed toward the propagation direction. Receiver couplers 82 advantageously are unidirectional and directed oppositely to the propagation direction, but they do not need to be such. The M-to-1 and the 1-to-M switches 76 and 78 for both buses 44 and 46 are similarly controlled to select two corresponding channels 48, but the correspondence of the channels 48 between the two buses 44 and 46 is logical rather than physical. More details of the media-access control module 52 will be described later.

In one preferred embodiment using wavelength-division multiplexing over optical fibers, each bus 44 or 46 is one optical fiber with a single receive coupler 82 connecting it to the M-to-1 switch 76, which includes a tunable optical filter, tuned by the media-access control module 70, and an optical detector feeding an electronic signal to the receiver 72. In this embodiment, the 1-to-M switch 78 is a planar array of diode lasers having different emission wavelengths. The media-access control module 70 selects the diode laser of the desired wavelength, and its transmitter 74 electrically modulates the selected laser. The outputs of the diode lasers, only one of which is activated in this embodiment, are combined into a single optical output channel, which is coupled through a single transmit coupler 80 onto the optical fiber constituting the bus 44 or 46. This embodiment is presented for concreteness, and the invention is not so limited. However, the embodiment does demonstrate that all electronics need operate only at 1/M-th of the total data rate of each bus 44 or 46.

The DQDB protocol, using a one-bit REQ field and a local request counter, will not work for the multichannel network of FIGS. 3 and 5 because a node 52 is not always monitoring each channel over which it may eventually transmit, and such continuous monitoring is required for the DQDB protocol. Thus, the DQDB protocol cannot keep its counters current as to the size of the distributed queue and its seniority within that queue.

Figure 4:
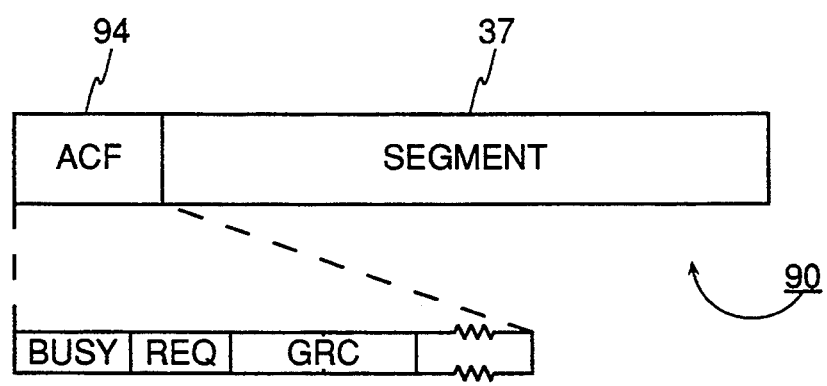
FIG. 4 is a frame format used in the EQEB protocol.

In contrast, the embodiment of the EQEB protocol, as illustrated in FIG. 4, uses the two unused, reserved bits in the 8-bit DQDB access control field ACF 94 for a two-bit field GRC, which represents a global request count. Each head end 50 broadcasts separate values of the global request count GRC for each slot it generates on each channel 48. The global request field GRC replaces the local request counters in DQDB since it eliminates the need for each individual node to keep track of upstream requests. As is done in DQDB, the one-bit REQ field is set by the nodes 52 in a backwardly propagating slot to indicate that a request has been distributively queued for forward propagation, and the one-bit, forwardly propagating BUSY field is set by a node when it writes segment data into that slot.

Figure 6:
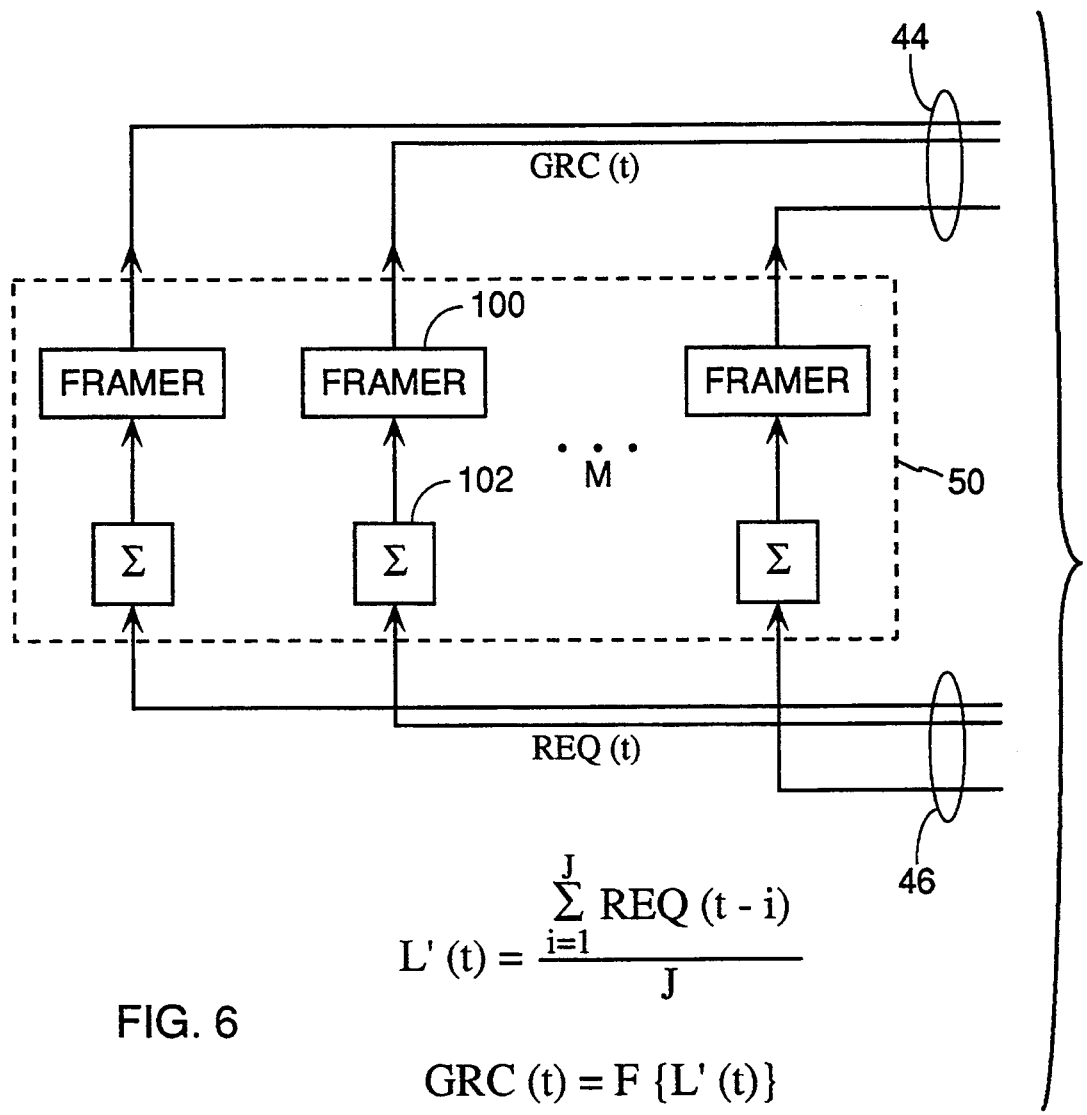
FIG. 6 is a schematic diagram of a head-end station located on each end of the expanded bus.
Figure 7:
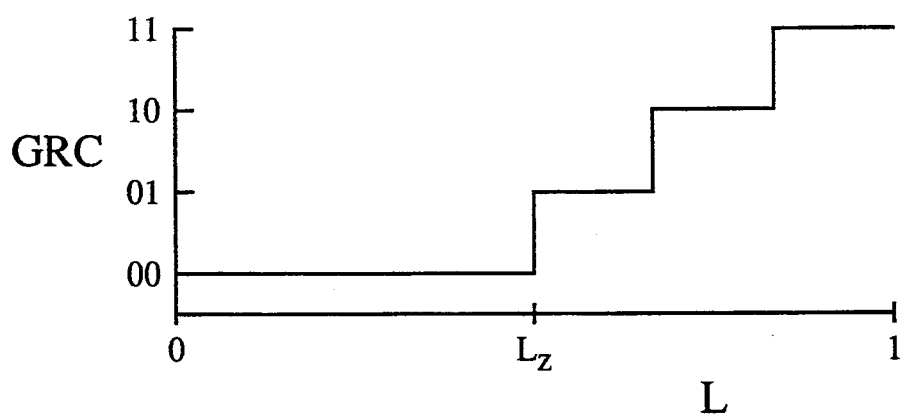
FIG. 7 is a graph of a functional relationship between the value of the global request counter and the estimate of queued request for one embodiment of the control algorithm.

The EQEB operation at the head ends 50 will be explained first. Let the one-bit value of the REQ field be represented as REQ(t), REQ(t+1) . . . for the times t, t+1, t+2 . . . of successive slots 90. Located within each head end 50, as illustrated in FIG. 6, in addition to the framing synchronizers 100 similar to those in DQDB, N summers 102 provide for every slot transmission period a current estimate of the queued requests along a channel pair. Specifically, the summers 102 maintain a list of the requests REQ(t) for the last J slots for the respective incoming channels and average those one-bit requests to produce a current value L'(t), which is between zero and one. The value of J can be chosen to account for all requests made in a one large round-trip time, or, if the round-trip time is small, it can equal the number of nodes N. To maximally utilize the available two bits, the value of L'(t) is encoded into the GRC field according to the algorithm illustrated in FIG. 7. If it is less than a parameter $L_z$, then the GRC field is set to 00. The other three, higher values of the GRC field are linearly mapped upon the remaining space (1-$L_z$). The parameter $L_z$ represents a normalized zero-delay load so that when L'(t) is below this value, the computed delay will be zero. This parameter $L_z$ is the upper limit of normalized bandwidth from a fixed channel that a single node can occupy, assuming there are no other competing nodes. It should be chosen as large as possible, but a too large value unduly lengthens the reaction time for a node taking up all the bandwidth to adjust itself to the traffic demand from others. A good compromise value is 0.7.

The value of GRC(t) transmitted along the respective bus 46 or 48 is a universal value for that bus indicating the estimated number of queued requests for that bus. The nodes along the bus estimate a delay from GRC(t) according to local considerations.

Figure 8:
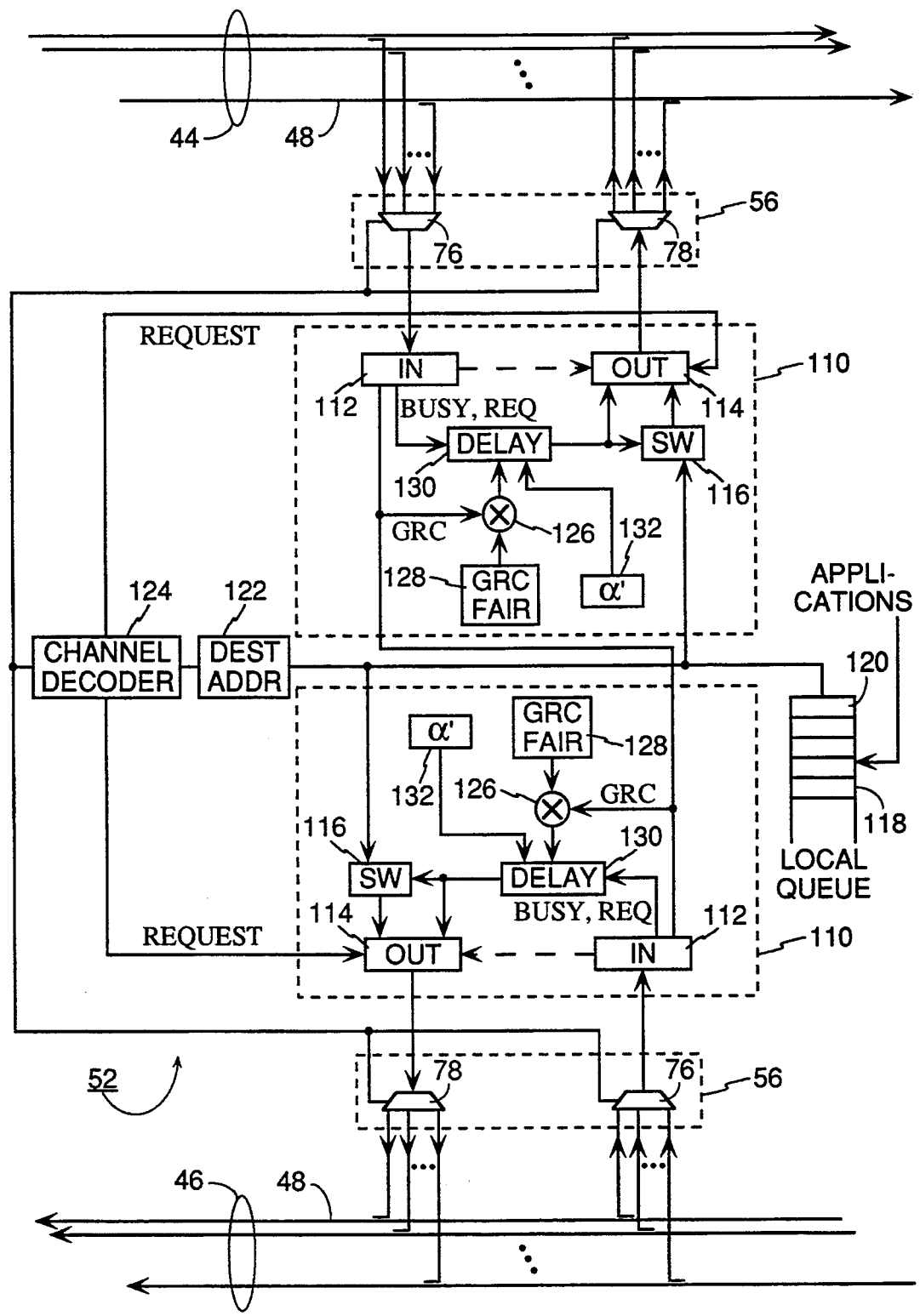
FIG. 8 is a yet more detailed circuit diagram of the node of FIG. 5.

Turning now to the transmitting portion of the nodes 52, as illustrated in FIG. 8, each media-access control module 70 includes two transmitting modules 110 transmitting to and receiving from respective buses 44 and 46. Within each module, an input buffer 112 receives all the slots from the channel 48 to which its M-to-1 switch 76 is tuned, and an output buffer 114 outputs slots to the channel 48 to which its 1-to-M switch 78 is tuned. The output buffer 114 receives segments of the slots for transmission from within the transmitting module 110 through a switch 116. If the node 52 is regenerative, it also receives slots from the input buffer 112.

The applications associated with the node 52 insert segments of a packet to be transmitted into a local queue 118 along with control information, such as the destination. When the segment reaches the top 120 of the queue 118, the destination address of the packet is loaded into a register 122. A channel decoder 124 translates the destination address according to a virtual-channel identifier (VCI) table and a channel table to identify on which channel 48 and in which direction the segment is to be transmitted. The channel decoder 124 tunes all the switches 76 and 78 for both buses 44 and 46 to the selected channel pair. It further attempts, after a request delay, to insert a request into the next available slot propagating in the reverse direction from the direction in which the segment is to be transmitted. That is, after the request delay, it interrogates the REQ field in each subsequent slot arriving in the selected channel until it finds a zero REQ field, and it changes that REQ field to one. At this point, the segment has entered the distributed queue. Thereafter, after an access delay to be described later, it attempts to transmit the segment into the next available slot propagating in the forward direction. That is, after the access delay, it interrogates the BUSY field in each subsequent slot arriving in the selected channel until it finds a zero, it changes that BUSY field to one, and it inserts the locally queued segment into the segment portion of that slot.

The process of transmitting a segment is described in more detail with reference to the flow chart of FIG. 9. Whenever a new segment reaches the top 120 of the local queue 118, the multi-access control (MAC) cycle of FIG. 9 begins. First, the segment destination and its receiving channel are determined by reading the destination address and interpreting it via the virtual-channel and real tables. The two switches 56 are then tuned to this channel 48.

Both the request delay and the access delay are calculated from the currently read value GRC(t) of the GRC field on the forward propagating channel. A multiplier 126 calculates the reverse, request delay as, in the simplest case, the product of the value GRC(t) of the forwardly propagating field GRC normalized to unity and the GRC_Fair parameter stored in a register 128 for the backwardly propagating module 110. More compli-cated delay functions will be described later. The product is used by a delay counter 130. The forward, access delay similarly uses the GRC_Fair parameter stored in the register 128. The fairness parameter GRC_Fair prevents an upstream node under heavily loaded conditions from monopolizing the transmission slots. To first approximation, the fairness parameter for a node located a fractional distance $X_i$ along the bus, relative to the head of the bus, is given by the equation $$GRC\_Fair(X_i) = D(1-X_i)N/2,$$

where D is a constant of proportionality which can be taken to be unity. The constants of proportionality reflect the fact that at peak load there are N/2 nodes waiting for transmission on each bus. More generally, the fairness function GRC_Fair may be calculated as a quadratic or higher-order function of $X_i$.

Because of the limited number of bits available for the global request counter, the delays need to be estimated rather than be unambiguously determined by the GRC field. Hence, the multiplier 126 should incorporate a non-linear function of GRC(t), such as that shown in FIG. 7. The function can be implemented by a look-up table. Under light traffic loads, the fairness algorithm becomes unnecessary and the delays should be reduced to zero. This can be achieved by assuring that the non-linear function of GRC(t) has a zero value for $L'$ less than $L_z$. The forwardly propagating value GRC(t) is used for both the request and access delays because both delays reflect congestion for forward transmission. However, the differing values of GRC_Fair on the two buses produce different request and access delays since the fractional distances $X_i$ are measured relative to the bus head in different directions.

A possible further delay, called bandwidth balancing, prevents lock-out in highly non-uniform traffic, such as when only two nodes are competing for the entire channel bandwidth. Lock-out is prevented by a bandwidth balancing parameter $\alpha'$ used in a counter 132. This parameter denotes the maximum fraction of the channel bandwidth which that node is allowed to use. The counter 132 monitors transmissions from the module 110 for both requests and segment transmissions, and it assures that they do not exceed the fraction $\alpha'$ of all slots. The value of $\alpha'$ may be constant or may linearly vary with position from the head end as $$\alpha' = \alpha'_o + (1-\alpha'_o)X_i.$$

The linear model with a value for $\alpha'_o$ of between 0.7 and 0.9 has been found to be satisfactory.

Figure 9:
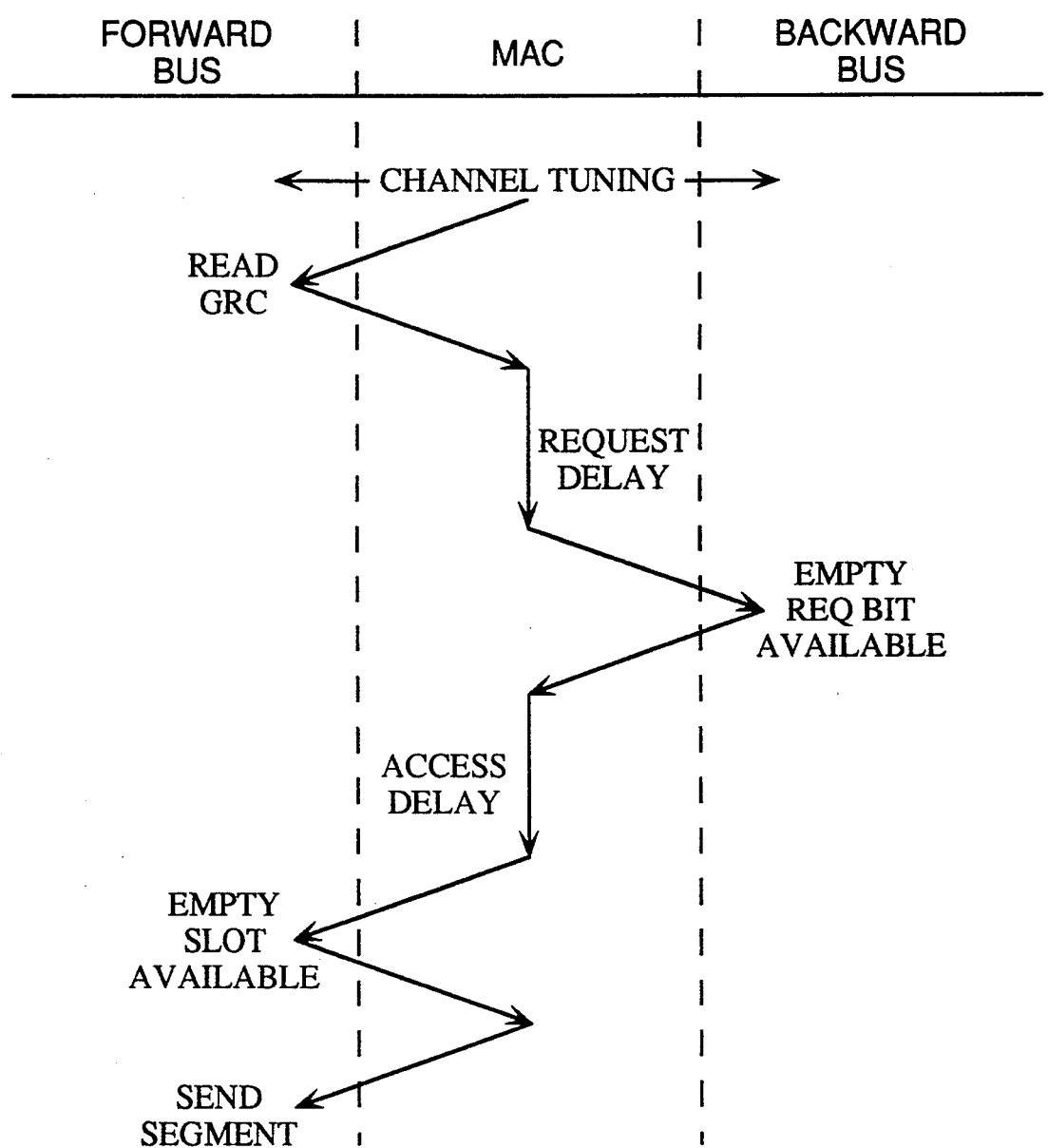
FIG. 9 is a flow diagram of the sequence of operation according to an embodiment of the EQEB protocol of the invention.

With reference to the flow chart of FIG. 9, after the delay counter 130 in the reverse direction has been initialized, it decrements for every slot passing on the backwardly propagating bus until the delay counter 130 is zero. Assuming that the bandwidth balancing counter 132 for the reverse direction is not locking out transmission, the delay counter 130 then enables the output buffer 114 to activate the first empty REQ bit it finds on any subsequent slot. The request phase is thus completed.

Immediately thereafter, the multiplier 126 in the forward module 110 determines the access delay by multiplying the fairness parameter GRC_Fair for the forward direction by the previously read value GRC(t) for the forwardly propagating GRC field and using the product to initialize its delay counter 130. That delay counter 130 then decrements according to the number of forwardly propagating slots. Assuming that the bandwidth balancing counter 132 for the forward direction is not locking out, the delay counter 130 then enables the switch 116 to output the top segment 120 in the local queue 118 including its destination address and other control information to the output buffer and to activate the BUSY bit in the outgoing slot. Thereafter, the slot is transmitted from the output buffer 114 through the 1-to-M switch 78 onto the desired channel 48.

Thereafter, the local queue 118 adjusts for the removal of a segment, and a new cycle begins at the node 52 under consideration.

Simultaneously with the operation of the transmission protocol, the reception modules are monitoring each slot of the respective single channel to which they are tuned. Any slot having a destination address corresponding to the node, as translated by the VMI, is removed from an input buffer similar to the input buffer of the transmission modules 110. Its segments are reassembled into packets, and the packets are routed to the applications associated with that node. The equipment and operation are similar to those found in DQDB.

The reception and transmission modules can be partially combined by expanding the M-to-1 switch 76 to an M-to-2 switch with its two outputs leading respectively to the reception and transmission modules. At moderately long intervals, the reception connections to the channels 48 can be reconfigured by such M-to-1 or M-to-2 switches, but the nodes throughout the network need to update their translation tables.

The above DQDB protocol has been extensively simulated, and I reported the results in "EQEB-A multichannel extension of the DQDB protocol with tunable channel access," *Globecom* '92, Orlando, Fla., December 1992, which also presents much of the above description. The simulation shows that the simple format and inexpensive equipment of the EQEB protocol nonetheless demonstrates remarkable throughput even for heavily overloaded conditions. For instance, with 16 channels and 1024 nodes, the throughput utilization factor can exceed 0.9 even under heavily overloaded conditions. I described an early version of this embodiment in "Subcarrier-multiplexed photonic dual bus with tunable channel slotted access for local/metropolitan area networks," *OFC* '92, February 1992, p. 300 and in "Estimated-queue expanded bus (EQEB) protocol for single-hop multichannel lightwave networks," *Electronics Letters*, vol. 28, 1992, pp. 855–857.

The above embodiment was designed within the slot-length restraints imposed by the existing DQDB format, that is, a one-bit REQ field and a two-bit GRC field. These constraints require that the queuing delays be estimated rather than completely defined. It would be desirable to expand both these fields. Let the REQ field for each priority level be able to hold a maximum value Max—Req, which may be as small as 2 while still providing advantageous operation. Any node can send a request by incrementing the REQ field of a backwardly propagating slot by one up to Max—Req. That is, more than one node can insert a request on one slot. At the head end, the summer keeps a running total of all incoming requests, that is, a global request count, but it decrements the total by one for each outgoing slot because that slot can be used by a requesting node. However, the global request count cannot become negative. The head end also transmits the value of the global request count in a large multi-bit GRC field larger than two bits so that the nodes more clearly can determine their seniority within the queue. The multi-bit REQ field makes the global request count a clearly defined value and also renders unnecessary the bandwidth balancing.

Figure 10:
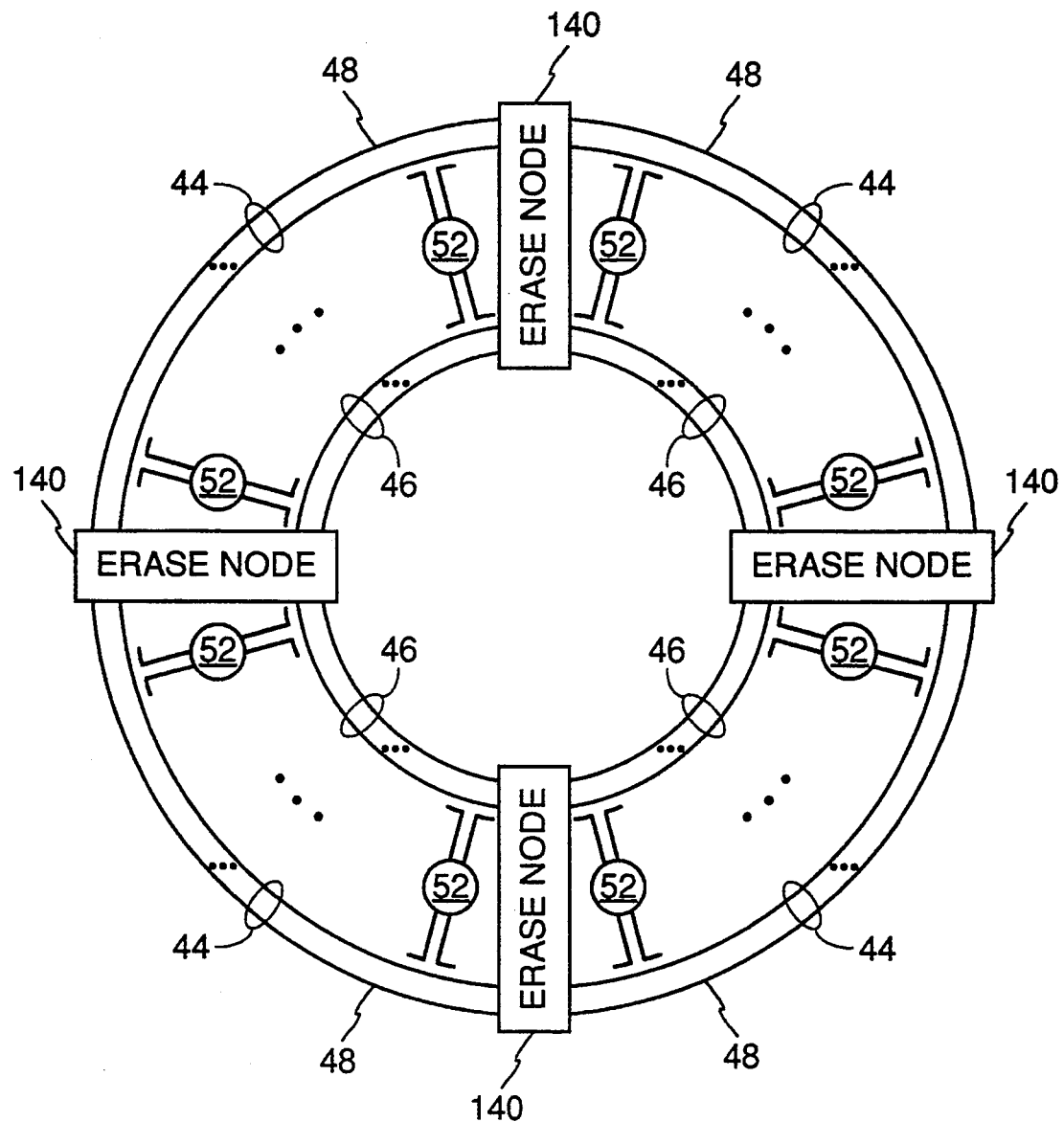
FIG. 10 is a circuit diagram of ring dual-bus communication network usable with the distributed-queue, dual bus (DQDB) protocol.

The invention can further be applied to a ring configuration, in what should be better called an estimated-queue, expanded-rings (EQER) protocol, although a ring can as well be denominated as a bus. As illustrated in FIG. 10, both buses 44 and 46 have their ends joined together in a ring. Both buses 44 and 46 pass through one or more, preferably two or more, erasure nodes 140. One or more nodes 52 are connected to the two buses 44 and 46 at locations between each pair of erasure nodes 140. The operation of the nodes 52 located between neighboring erasure nodes 140 is similar to that described previously for a linear network.

Figure 11:
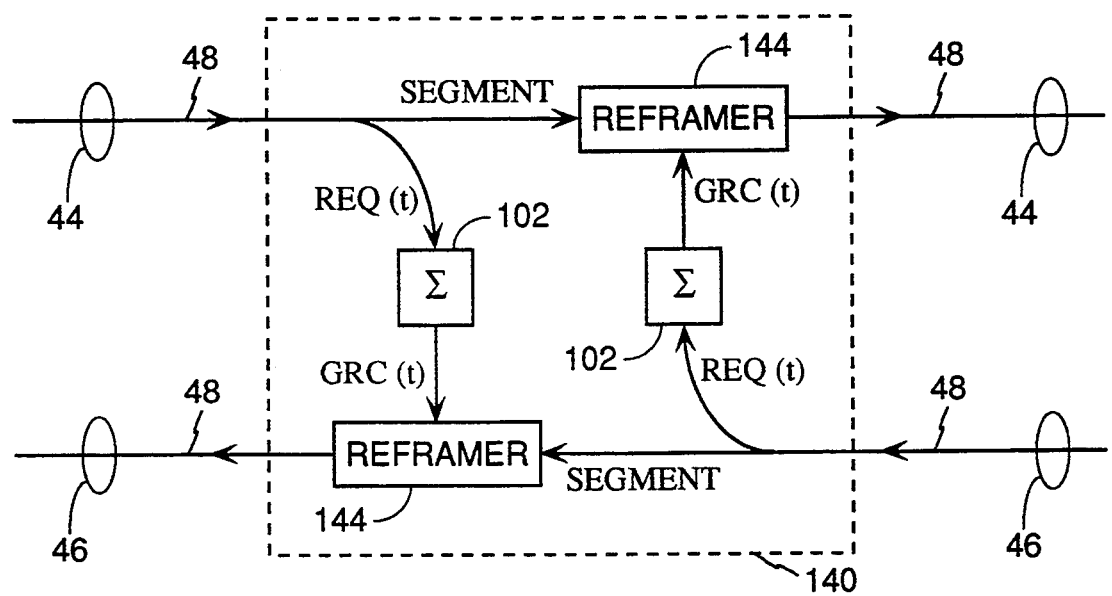
FIG. 11 is a detailed circuit diagram of an erasure node of the circuit diagram of FIG. 10.

The erasure nodes 140 operate similarly to such nodes described by Rodrigues in "Erasure Node: Performance Improvements for the IEEE 802.6 MAN," *IEEE Infocom* '90, pp. 636–642, 1990. As illustrated in FIG. 11, the request REQ(t) values in the REQ field are diverted to the summer 102, which produces a global request value GRC(t). However, the segment portion of the slot is input to a reframer 144 which regenerates the slot propagating along the channel 48. If the slot has not been addressed to a node in the previous linear portion, the reframer 144 regenerates the slot with the previous value of the segment propagating in that same direction. If the slot has been addressed to a node in the previous linear portion, the reframer 144 removes the segment portion and indicates that the slot is no longer BUSY. The reframer 144 performs other framing and synchronization functions of the framer 100 of FIG. 6. The reframer 144 further incorporates the values of GRC(t) into its GRC field, which have been generated by the summer 102 within the erasure node 140, as has been previously described. Preferably, the reframers 144 are allowed to transmit onto the forwardly propagating bus only a fraction $\alpha'$ of the time, in order to balance the bandwidth.

Thus, the linear portions of the ring network between the erasure nodes 140 conform quite closely to the behavior of the linear network of FIG. 3, but data can be passed between linear portions of the ring network. However, the ring architecture increases the capacity because the erasure nodes 104 allow reuse of the slots.

The ring configuration increases the reliability. If one or both ring buses are severed at a single location, the dual ring reconfigures to a single ring. In this situation, only one erasure node 140 should be used in the ring, which now looks like a linear EQEB network.

The invention employs a novel combination of several elements. The request registration and slot acquisition are symmetrical. A global request counter is used. The local queuing is estimated.

The invention thus allows for high throughput communication systems while the speed of the individual nodes can be reduced. Thus, the architecture is economical while it still provides very high total capacity. Such an architecture appears necessary when the total throughput substantially exceeds the limit of a few gigabits per second.

What is claimed is:

1. A distributively queued communication network comprising
   a first and a second end station;

a first and a second bus connecting said first and second stations and each comprising a plurality of respective unidirectional channels;

framer means within each of said end stations for generating repetitive formatted slots on first ones of said channels unidirectional away from said end stations, the format of said slots comprising a request field, a multi-bit counter field, and data field;

tabulation means within each of said end stations for counting values of said request field appearing on second ones of said channels unidirectional towards said end stations and for inserting an estimated global request count derived from said counted value from one of said first channel-s into the counter field of a corresponding second channel, said estimated global request count being a non-linear function of said counted value of said request field; and a plurality of communication nodes arranged along said first and second buses for receiving data contained in the data field s of slots from first channels in each of said buses and tunably connected to second channels in each of said buses for insertion of data into data field-s of slots on said second channels, said nodes including means for reception of said estimated global request count, means for modification of a request value in a request field of a slot after a delay dependent on said estimated global request count, and delay means for inhibiting the insertion of data by the node in a data field of a slot for a time period derived from said estimated global request count received by said node.

2. A distributively queued communication network as recited in claim 1 further comprising tunable switches connecting each said node to said unidirectional channels.

3. A distributively queued communication network as recited in claim 1, wherein said time period is additionally derived from a factor dependent upon the position of said node along said buses.

4. A distributively queued communication network comprising a first and a second end station;

a first and a second bus connecting said first and second end stations and each comprising a plurality of respective unidirectional channels;

framer means within each of said end stations for generating repetitive formatted slots on said channels outgoing from said end stations, the format of said slots comprising a one-bit-request field, a two-bit counter field, and a data field;

tabulation means within each of said end stations for counting values of said request field-s for said channels incoming to said end stations and inserting an estimated global request count derived from the counted value from one of said incoming channel-s into the counter field of a corresponding outgoing channel; and a plurality of communication nodes arranged along said first and second buses receiving data contained in the data field from a first one of said channels in each of said buses and tunably connected to a second one of said channels in each of said buses for insertion of data into the data field, for reception of said estimated global request count, and for modification of a request value in the request field of a slot after a delay derived from said received estimated global request count.

5. A communication network comprising a first and a second station;

a bus extending between said first and second stations and including a plurality of first communication channels propagating from said first station to said second station and a plurality of second communication channels propagating from said second station to said first station, said first and said second communication channels being arranged in paired channels of one first communication channel and one second communication channel, wherein said first and said second stations impress upon said first and said second communication channels repetitive formatted slots including a one-bit request portion, a two-bit counter portion, and a data portion;

a plurality of nodes arranged along said bus and connected to said first and second communication channels;

wherein each of said nodes having a data segment to transmit on a first one of one said paired channels changes the request portion in one slot impressed upon a second one of said paired channels;

wherein the one of said first and second stations receiving a slot from a second one of said one paired channel accumulates information from the request portions in a plurality of slots impressed upon said one of said second paired channels, calculates therefrom a global request counter, and transmits said global request counter in the counter portion in one of said slots on said first one of said one paired channel;

wherein each said node receives said global request counter from said first one of said said one paired channel, delays transmitting for an access time period derived from said global request counter, and thereafter transmits the data segment in the data portion of one said slots carried by said first one of said one paired channel;

wherein each said node comprises means for delaying changing a request portion of said one slot for a request time period derived from said received global request counter; and wherein each said node comprises a first and a second fairness register each containing factor at least a derived from the relative position of each said node along said first and second communications channels respectively from said first and second stations respectively, and wherein said access time period and said request time period are additionally derived from said fairness factors contained in said first and second fairness registers respectively.

6. A communication network as recited in claim 5, wherein said each node receives a data segment for transmission from a source associated with said each node and in response to a destination address associated with the data segment selectively tunes to the paired communication channels comprising said first and second paired communication channels.

7. A communication network as recited in claim 6, wherein said each node receives a data segment for distribution to said source only from a second pair of said paired communication channels.

8. A multi-channel communications method, comprising the steps of impressing upon a plurality of first channels propagating in a first direction and upon a plurality of second channels propagating in a second direction opposite to said first direction repetitive slot format-s each comprising a request field, a count field, and a data field;

counting a plurality of values of the request field-s on each one of said first channels and inserting a count value derived from the counted values into the count field on a corresponding each one of said second channels; and independently and in parallel at a plurality of communication nodes arranged along said first and second channels:

receiving data segments contained in the data field conveyed by one of said first channels;

in response to a destination address for a data segment to be transmitted, tuning to a selected one of said first channels and a correspondingly selected one of said second channels;

receiving a count value propagating on said selected first channel;

modifying a value of a request field in one slot propagating on said selected second channel;

assigning at least one position value to each node indicating a relative position of the node along said first and second channels;

calculating an access delay period from the received count value and from said position value; and thereafter inserting the data segment into the data field of a slot propagating on said selected first channel after a delay of the access delay period.

9. A multi-channel communication method as recited in claim 8, further comprising: calculating a request delay period from said received count; and delaying said modifying step by said request delay period.

10. A communication method as recited in claim 8, wherein said counting and inserting step determines the count value from a non-linear function of the counted values.

11. A communication method as recited in claim 10, wherein said counting and inserting step counts the plurality of values over a predetermined number of slots.

* * * * *